United States Patent [19]

Carman, Jr.

[11] 3,976,161
[45] Aug. 24, 1976

[54] POWER AUGER SEISMIC SOURCE

[75] Inventor: Wilson H. Carman, Jr., Houston, Tex.

[73] Assignee: Amoco Production Company, Tulsa, Okla.

[22] Filed: Dec. 4, 1972

[21] Appl. No.: 312,170

Related U.S. Application Data

[63] Continuation of Ser. No. 61,293, Aug. 5, 1970, abandoned.

[52] U.S. Cl. .............................. 181/116; 181/113; 181/117; 181/401
[51] Int. Cl.$^2$ ............................................ G01V 1/04
[58] Field of Search ............ 181/.5 EC, .5 XC, 113, 181/117, 119, 401, 116

[56] References Cited
UNITED STATES PATENTS

| | | | |
|---|---|---|---|
| 1,627,991 | /1927 | Owen | 181/.5 XC |
| 2,353,484 | 7/1944 | Merten | 181/.5 XC |
| 3,034,595 | 5/1962 | Thompson | 181/116 |
| 3,206,936 | /1965 | Moor | 181/.5 EC |
| 3,391,544 | 7/1968 | Daczo | 181/.5 EC |
| 3,687,229 | 8/1972 | Carruth | 181/.5 XC |
| 3,702,635 | 11/1972 | Farr | 181/116 |

*Primary Examiner*—H.A. Birmiel
*Attorney, Agent, or Firm*—Newell Pottorf

[57] ABSTRACT

Seismic waves are generated by detonating an explosive gas mixture in an earth cavity formed by driving a short earth auger to a desired depth, leaving most of the augered earth in the hole surrounding the auger shaft, and then pulling the auger and shaft upwardly to lift and compress the augered earth and pack it around the auger shaft, thereby forming and sealing the cavity below the auger. The gas mixture is then introduced through the hollow auger shaft and detonated, preferably by ignition propagation through the connecting hose and the auger shaft. Upon completion of as many gas fills and detonations as may be desired, the auger is reversed and withdrawn, leaving the ground surface virtually undisturbed.

12 Claims, 6 Drawing Figures

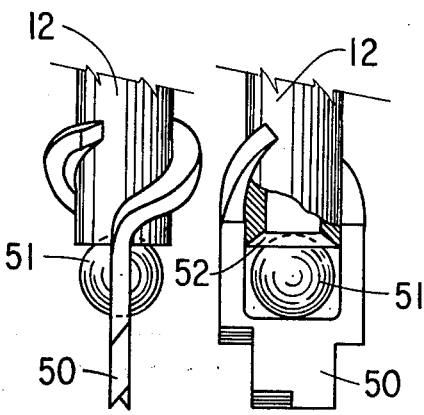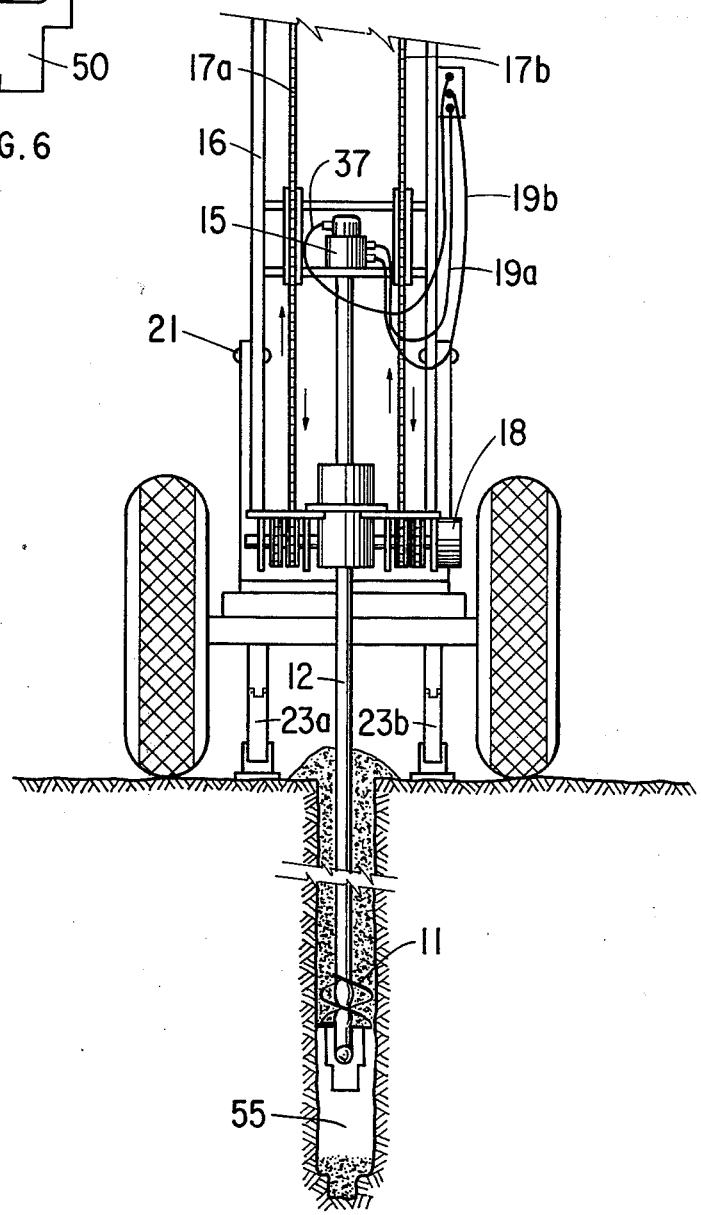

POWER AUGER SEISMIC SOURCE

This is a continuation of application Ser. No. 61,293 filed Aug. 5, 1970, and now abandoned.

BACKGROUND OF THE INVENTION

1. Field of the Invention

This invention relates to generating seismic waves, and is directed particularly to generating such waves for seismic geophysical surveying and like purposes using explosives. Specifically, the invention is directed to the explosive generation of seismic waves by forming a cavity below the earth's surface, filling it with an explosive gas mixture, and then detonating the mixture to produce the waves.

2. Description of the Prior Art

During about the first two or three decades of seismic geophysical surveying, virtually the only source of the desired seismic waves was the detonation of chemical explosives in a shot hole drilled to a depth below the weathering, despite the hazards of explosives-handling and the time and expense of drilling the shot holes. With the advent of data-processing and magnetic-recording techniques providing reproducible recordings, a great many alternate forms of seismic source became practical, such as vibrators, weight droppers, gas-gun and other impulse generators, impactors, and the like, all generally operating at the ground surface. Reproducible recording and data processing made these alternate sources practical by the possibility of summing the waves resulting from a number of relatively weak impulses, or time-compressing continuous-wave inputs which extend over long time periods, to provide the desired seismic-wave travel times. Most of these ground-surface wave generators are characterized by large masses, heavy mechanisms, complex mechanical systems, heavy transporting vehicles, and other attributes making them more or less costly to provide and use. In view of this, it is a primary object of my invention to provide a novel and improved explosive seismic source which does not require drilling deep shot holes, is self-contained, fast, safe, economical, and convenient to use, and causes a minimum of ground-surface damage.

SUMMARY OF THE INVENTION

The foregoing and other objects and advantages are attained by a vehicle on which is mounted a short earth auger on a hollow shaft of a length to reach the desired depth for forming a cavity, together with means for rotating and for raising and lowering the auger, plus means for mixing and charging to a cavity formed thereby an explosive gas mixture, and means for initiating detonation of the gas. In operation, at a location where it is desired to generate seismic waves, the auger is first drilled down to the desired depth leaving most of the augered earth in the hole about the auger shaft, the auger is then pulled up a fraction of the hole depth to compress the loose earth thereabove and seal a cavity formed thereby below the auger, a detonatable gas mixture is charged to the cavity, and detonation is accomplished by ignition through the connecting hose and auger shaft from an electric spark, the ignition perhaps propagating as a high-velocity flame in the narrow-diameter hose and auger shaft but converting to detonation upon reaching the cavity volume. By venting the gaseous detonation products to the atmosphere after each detonation, the cavity can be refilled with explosive gas mixture and the detonation repeated as many times as may be desired. When the number of detonations is considered sufficient, the auger is removed simply by lifting while rotating in the reverse direction, the augered earth still remaining in the hole and leaving the ground surface virtually undisturbed.

BRIEF DESCRIPTION OF THE DRAWINGS

This will be better understood by reference to the accompanying drawings forming a part of this application and illustrating a prototype model of a preferred embodiment of the invention. In these drawings.

FIGS. 2 and 3 are partially detailed side and rear elevation views of the prototype unit;

FIGS. 5 and 6 are Orthogonal elevation views of the lower end of the auger shaft.

DETAILED DESCRIPTION OF THE PREFERRED EMBODIMENT(S)

Figure 1:
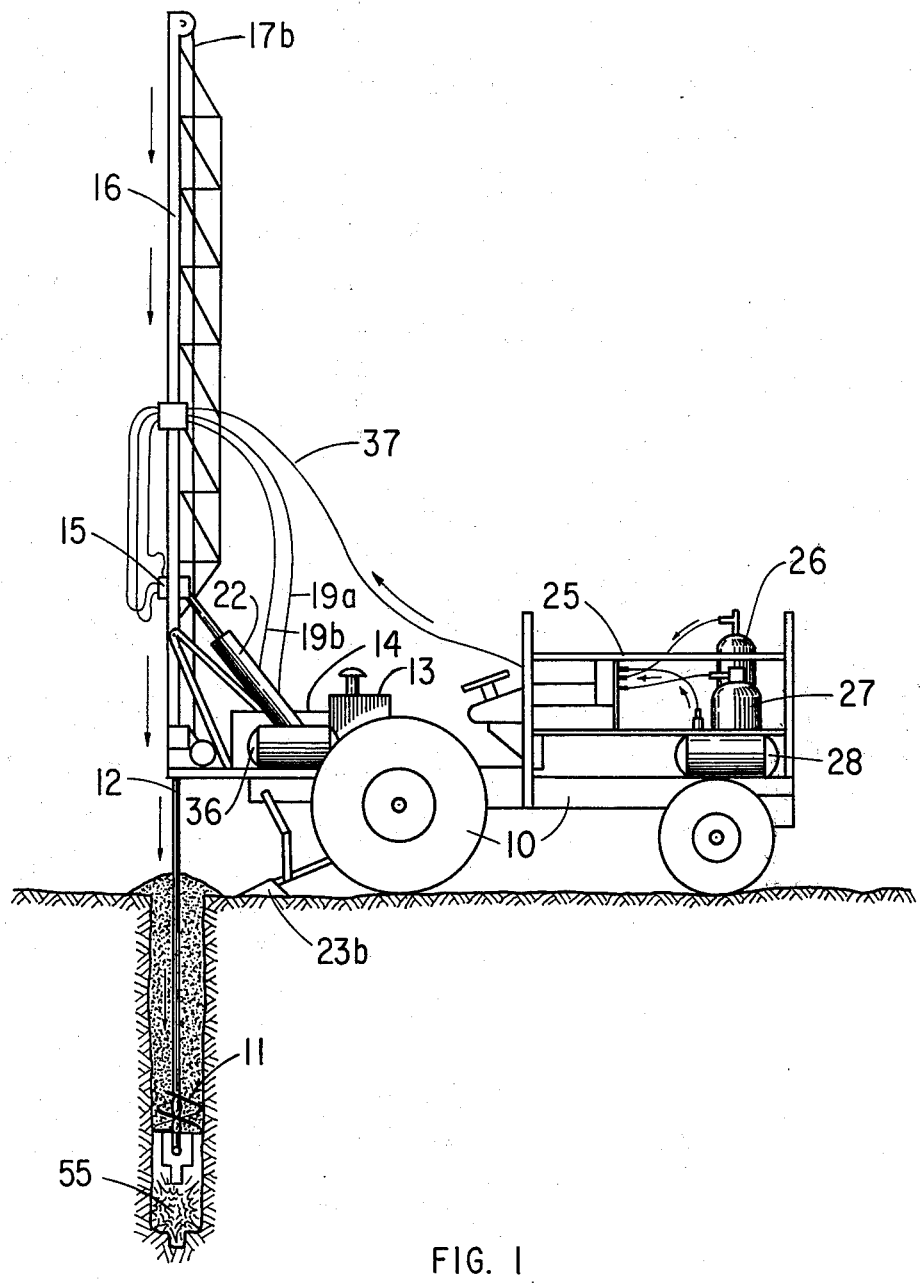
FIG. 1 is an over-all side elevation view of a prototype model of the invention in operation.
Figure 2:
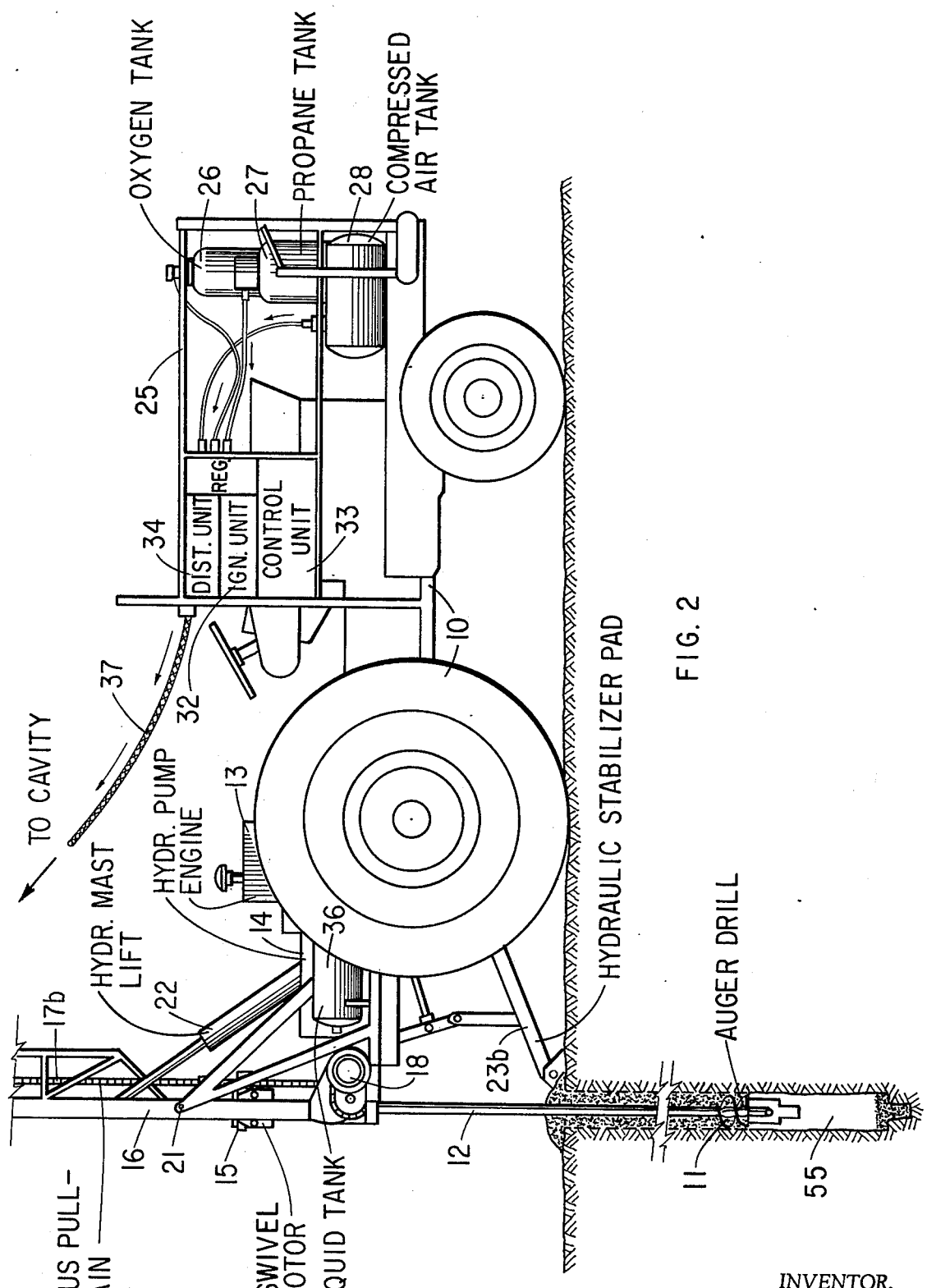

Referring now to the drawings and in particular to FIGS. 1, 2 and 3 thereof, shown mounted on a self-propelled vehicle 10 is a prototype model of the invention comprising a short earth auger 11 at the lower end of a hollow shaft 12, together with means for driving the auger both rotationally and axially. The latter means comprises an internal combustion engine 13 driving a hydraulic pump and pressure accumulator 14 having flexible hose connections to a reversible hydraulic power swivel 15 attached to the upper end of auger shaft 12. Power swivel 15 is moved along a vertical mast 16 by a pair of pull-down or hoist chains 17a, 17b, actuated by a reversible hydraulic motor 18, the mast 16 being strongly braced for both torsion and lifting as it must supply both the necessary backup torque and the lifting forces needed for auger operation. Flexible pressure hoses 19a, 19b transmit hydraulic pressure fluid between pump 14 and the hydraulic motor of swivel 15 via conventional control valving, not shown, by which the speed and direction of rotation of auger 11 can be varied as desired. By similar conventional hydraulic connections and control valves, not shown, hydraulic power is also controllably transmitted between pump 14 and hoist or pull-down motor 18.

Mast 16 preferably pivots at point 21 and may be raised to the operating position shown or lowered to a horizontal position for moving, by a hydraulic cylinder and piston 22. Stabilizer pads 23a, 23b also actuated by a hydraulic cylinder and piston may be forced against the ground surface to help support the varying vertical load on mast 16 during raising or lowering of auger 11 and shaft 12.

Carried in a rack 25 mounted on vehicle 10 are a high-pressure oxygen container 26, a propane-containing supply vessel 27, and a compressed-air storage tank 28. Associated with each supply vessel is a conventional adjustable pressure-regulating valve 29, 30 and 31 (see FIG. 4), the oxygen and propane being fed to a gas-mixing and ignition unit 32. Also mounted on vehicle 10 is a communication, fill, and ignition control-circuit unit 33, a flow-distribution control unit 34, and a liquid-supply vessel 36. A metal-reinforced flexible hose 37 extends from unit 34 to the fluid passage of swivel 15 and thence to the central passage of auger shaft 12 opening into the subsurface cavity. The diameters of the passages through hose 37 and shaft 12 are kept small enough (typically, one-half inch diameter, more or less) so that the explosive power of the gas mixture, whether released by detonation or flame propagation at high velocity is contained without causing destruction or rupture.

Figure 4:
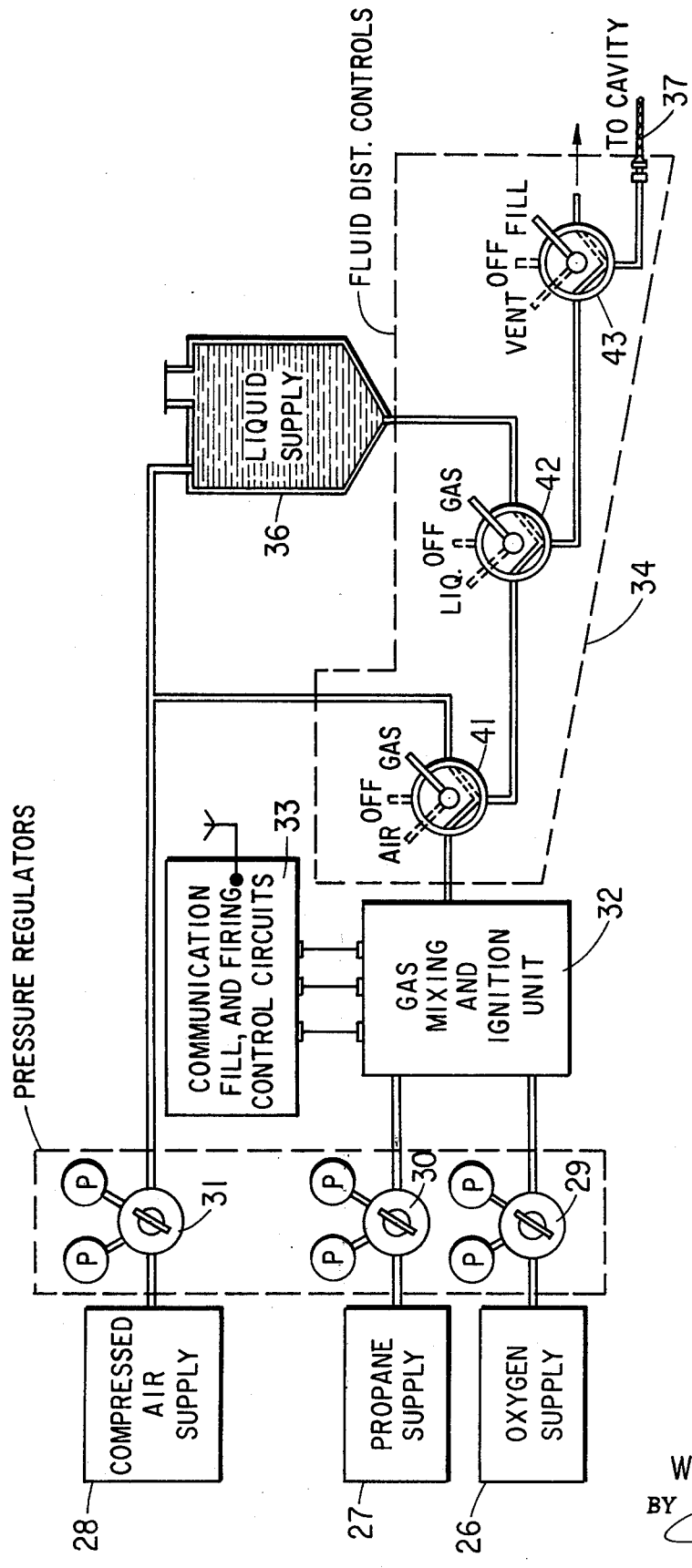
FIG. 4 is a diagram of the liquid and gas flow-control systems used in this invention.

The fluid-distribution control system 34 is shown in diagrammatic form by FIG. 4 and comprises three two-way valves 41, 42 and 43 with connecting flow lines between the various supply vessels and the flexible hose 37 leading to auger shaft 12 and auger 11. The communication, fill, and ignition-control circuit 33 and the gas-mixing and ignition unit 32 are commercially available units sold by the Geo Space Corporation of Houston, Texas, as components of the trademarked "Flex-O-Fire" system. The unit 32 contains filters, electrically-operated valves, proportioning orifices, and a spark plug and ignition coil, plus connecting fittings. It takes oxygen and propane from regulators 29 and 30, respectively, mixes them in the proper proportion to form a detonatable gas mixture for delivery into hose 37, and then upon command ignites the mixture to produce detonation. The unit 33, commercially identified as the Geo Space CTU-481-J Control Unit, besides having radio communication and control-signal links to a remote recording unit, provides operating voltages or signals for the valves and the igniter of unit 32 by, for example, timing the opening and closing of the fill valves, providing "ready" signals, and transmitting a firing signal to ignition unit 32 under either manual or remote automatic control.

Air-gas valve 41, depending on the position of its operating handle, takes as input either the detonatable gas mixture from mixing unit 32 or compressed air from the output of regulator 31. Gas-liquid valve 42 accepts either the gas flow from valve 41 or compressed air-driven liquid from liquid supply 36 for transmission to vent-fill valve 43 and thence to hose 37 leading to the detonation cavity. In its alternate position, shown dotted, valve 43 vents hose 37 (and the cavity) to the atmosphere.

As is best shown in FIGS. 5 and 6, immediately below auger 11 at the lower end of shaft 12 is a small fishtail pilot bit 50 and a checkvalve ball 51 which seals the enlarged opening at the end of shaft 12 when pushed upwardly against the valve seat 52 by the earth during downward progress of auger 11 through the earth. This prevents earth from entering and plugging the central passage of auger shaft 12. Auger 11 is "short" in that it extends along shaft 12 for only about the auger diameter or pitch distance, more or less, rather than along the entire subsurface length of the shaft, as the function of the auger is to bore through and loosen the soil rather than remove it completely from the drilled hole.

In usual field operation, at a shotpoint location where it is desired to generate seismic waves, assuming that mast 16 has been raised and stabilizer pads 23a, 23b lowered, the vehicle operator applies hydraulic power to swivel 15 to rotate shaft 12 and auger 11 in the "down" direction, and to pulldown-hoist motor 18 to lower them. After pilot bit 50 and auger 11 have entered the earth, little or no downward force but only rotation is usually required for the downward progress of the auger to continue, as it tends to push or "screw" itself downwardly by reaction against the loosened auger earth above it. If a hard stratum or some other impediment is encountered, however, as much downward force may be applied as necessary, of course, not exceeding the weight of the rear portion of vehicle 10 and equipment mounted thereon.

When auger 11 reaches a suitable or desired depth, typically the maximum permitted by the length of shaft 12, the direction of rotation of hoist motor 18 is reversed to pull up strongly on shaft 12 and auger 11, preferably while continuing to rotate them in the downward-drilling sense. This tends to retain the auger filled with earth and to compress the loosened augered earth thereabove, packing it firmly together both against the hole wall and around shaft 12, forming a seal above the auger and leaving a cavity 55 below of the same diameter as the auger and of a length about equal to the amount of pull-up.

Rotation is then stopped while continuing to hold the auger 11 at its pulled-up position, and, with the valves 41, 42 and 43 in their solid-line positions of FIG. 4, upon command by unit 33 a charge of detonatable gas mixture is delivered by unit 32 through hose 37 and shaft 12 into cavity 55. Valve ball 51 is easily displaced from seat 52 by the gas pressure, if it has not previously dropped away freely during auger pull-up. Next, upon receipt of a firing command from unit 33, spark ignition of the gas mixture occurs in unit 32, travels at high velocity through valves 41, 42, 43, hose 37, and shaft 12 into cavity 55, where detonation of the gases therein and the generation of the desired seismic waves ensue. Hot combustion gases are then preferably exhausted into the atmosphere by momentarily throwing valve 43 to the left to the VENT position. Upon returning it to the FILL position and recharging cavity 55, it is ready for a second firing and detonation, the sequence of venting, recharging, and firing being repeatable as many times as seismic-wave generation is desired at the location. Whether the ignition travels from the spark plug of unit 32 to cavity 55 by detonation, high-velocity flame, or some other mode, is not known, the point of importance being that its propagation time is short and constant within a millisecond.

In limited field testing, it has been observed that summing corresponding traces recorded during three successive detonations at one location usually gives a clear improvement in random-noise cancellation over any single trace from one detonation. On the other hand, summing more than ten traces from 10 successive detonations seldom gives a worthwhile further improvement in the signal-noise ratio. When the number of shots is considered sufficient at the location occupied, hydraulic power is applied to swivel 15 with its direction of rotation reversed to that during drilling down of the auger 11, and some lifting force is applied to the auger and shaft by hoist motor 18 through chains 17a, 17b. The auger then easily drills itself back to the ground surface without displacing any appreciable further amount of the augered earth from the hole. Such augered loose earth as may form a small surface mound at the location can either be pressed back into place easily, or if left untamped will settle itself back level in a few days of normal weathering processes.

For moving short distances, as when shooting a pattern of shotpoints, stabilizer pads 23a, 23b are raised, but mast 16 can frequently be left in its upright position ready to start drilling down at the next location. For longer moves or to avoid obstructions, however, it may be lowered to an approximately horizontal position by use of hydraulic piston and cylinder 22.

In the majority of operating conditions, valves 41 and 42 remain in their solid-line positions of FIG. 4, while valve 43 alternates between the VENT and FILL positions. Sometimes, however, the auger 11 may encounter subsurface water which will prevent proper detonation of the oxygen-propane mixture. It is then frequently helpful to turn valve 41 to the AIR position and, by alternating valve 43 between the FILL and VENT positions one or more times, apply compressed-air pressure to cavity 55 either to force the water therein back into the surrounding earth or, during venting, to blow it out of the auger-shaft passage and the hose 37 into the atmosphere. Upon then returning valve 41 to the GAS position, charging and detonation of the combustible mixture in cavity 55 can proceed normally.

Instances also sometimes arise when liquid from supply 36 may be employed to advantage. In porous earth, such as sand, a substantial part of the combustible gas charge may leak out of the cavity into the surrounding formation pores where it will not detonate. Then, by throwing valve 42 to the LIQUID position, liquid driven from supply 36 by compressed-air pressure can be forced into cavity 55 to seal its walls and floor or at least reduce their permeability to gas flow. Water is useful for this purpose, particularly if its viscosity is increased by adding bentonite or the like and perhaps also including sealing fibers, granules, and/or flakes, such as are used for recovering lost circulation in rotary drilling. Also, small injections of liquid during the drilling-down of auger 11 in hard, dry soil may sometimes ease the drilling by a lubrication effect on the auger. Conceivably also, occasional bursts of compressed air during drilling down may aid the auger in its work.

By way of example and not of limitation, in a prototype model of the invention, a twin-flight auger six inches in diameter with each of the two helices making less than one complete turn on shaft 12 could be drilled to a maximum depth of about ten feet. Pulling up two feet left a cylindrical cavity about six inches in diameter and two feet long, which was charged with a mixture of oxygen and propane at a pressure of about 50 pounds per square inch gauge. Detonation produced seismic waves which appeared quite similar in amplitude and frequency spectrum to those produced by about one pound of dynamite detonated at the same depth for comparison. Some apparent cavity enlargement by the pressure of the detonating gases was sometimes noted by inference from the increased energy of later detonations, but the benefit of their greater energy was often in some degree offset by "hole-fatigue" effects, i.e., plastic deformation of the earth and other energy-absorbing (and frequency-lowering) phenomena.

When the entire desired two-foot pullup could not be obtained, one or more preliminary detonations would frequently enlarge the smaller cavity to one of useful size and energy output. Quite satisfactory speed of operation was obtained, as it was often possible to drive the auger to a depth of ten feet, pull up two feet, and charge the cavity ready for firing in less than 60 seconds. Venting, recharging and firing could produce additional seismic wave-generating pulses at less than ten-second intervals.

In watery soil conditions, it may sometimes be of assistance to inject compressed air before and/or while the auger is being lifted to form the cavity. This will help to hold back water which might otherwise tend to enter into the cavity due to a low pressure or partial vacuum effect as the auger raises and compresses the earth thereabove. Obviously, also greater explosive power can be obtained by increased cavity depth, length, diameter, and charging pressure. As the impulse power is believed to be generally proportional to cavity volume, which varies as the square of the diameter, that parameter is perhaps the preferred one to be adjusted.

As compared with vehicles transporting heavy reaction masses or dropping weights and/or prime movers and hydraulic pumps, the vehicle 10 of this invention can be relatively small and light-weight, thus minimizing harm to the environment. Neither is there a need for vehicle 10 to be heavy to provide the hold-down weight that many ground-surface seismic sources require for ground coupling. No tendency for hole blowout has ever been observed--on the contrary, successive detonations pack the augered earth more and more firmly in the hole and about the auger shaft, increasing the sealing effect. Propane is only one of a number of fuel gases which form a satisfactory detonatable mixture with oxygen or air, being chosen for testing and illustration of the invention chiefly due to its economy and convenience.

Except for an operator to move vehicle 10 and monitor the augering, charging and venting operations, most of the various functions can be initiated and/or controlled by signals from a remote recording point. Therefore, two or more auger units on the same or different vehicles can be operated and fired in synchronism or other desired time pattern to gain input-signal power, cancel interference waves, or any other purposes for which multiple source points are useful.

I claim:
1. A method of generating seismic waves which comprises the steps of
    rotating and driving an earth auger down to a desired depth in the earth so as to loosen said earth and form a hole therein but leave a substantial part of said loosened augered earth remaining in said hole about the auger shaft,
    raising said auger and shaft a fraction of said depth to compress and seal said augered earth in said hole and about said shaft and to form a cavity in the earth therebelow,
    introducing a detonatable gas mixture through said auger shaft into said cavity, and
    detonating said gas mixture within said cavity to generate seismic waves.
2. A method of generating seismic waves as in claim 1 including the futher steps of
    venting said cavity to the atmosphere to exhaust any gaseous detonation products present therein at superatmospheric pressure,
    introducing an additional charge of said gas mixture into said cavity, and
    detonating said additional charge to again generate seismic waves.
3. A method as in claim 2 in which said venting, charge-introducing, and detonating steps are repeated in succession until there have been between three and ten seismic-wave generations in said cavity.
4. A method of generating seismic waves as in claim 1 including the further steps of
    raising and reverse-rotating said auger to withdraw it through said augered earth to the ground surface without displacing any substantial additional amount of said augered earth from said hole.
5. A method of generating seismic waves as in claim 1 including the preliminary additional steps of
    charging said cavity with said gas mixture, detonating said charged gas mixture in said cavity to enlarge it, and venting said enlarged cavity to the atmosphere, prior to said step of introducing said gas mixture into said cavity for detonation therein to generate seismic waves.

6. A method of generating seismic waves as in claim 1 including a preliminary step of injecting into said cavity a quantity of liquid effective to substantially reduce the gas permeability of the cavity walls, prior to said step of introducing said detonatable gas mixture.

7. A method of generating seismic waves as in claim 1 including a preliminary step of introducing a quantity of gas at superatmospheric pressure into said cavity to force liquid therein out into the pores of the surrounding formation or, upon venting, out into the atmosphere, prior to said step of introducing said detonatable gas mixture.

8. A seismic-wave source comprising, an earth auger on a hollow shaft, said auger extending along said shaft only for a length of the same order of magnitude as the auger diameter, means for rotating and for raising and lowering said auger and shaft, a supply of detonatable gas mixture, means for introducing a quantity of said gas mixture through said shaft into an earth cavity formed by said auger, and means for detonating said gas mixture within said earth cavity to generate seismic waves.

9. A seismic-wave source as in claim 8 including also check-valve means closing the lower end of said shaft while said auger is moving downwardly through the earth.

10. A seismic-wave source as in claim 8 in which said mixture-introducing means comprises a tubular conduit extending from said supply through said shaft to said cavity, of a diameter sufficiently small that the energy of combustion or detonation of said gas mixture is incapable of rupturing the conduit wall, and in which said detonating means comprises an ignition source near the supply end of said conduit.

11. A seismic-wave source as in claim 8 including also a supply of liquid, and means for introducing a quantity of said liquid from said supply into said cavity.

12. A seismic-wave source as in claim 8 including also a supply of non-combustible gas under superatmospheric pressure, means for introducing a quantity of said gas into said cavity, and means for venting said cavity to the atmosphere.

* * * * *